United States Patent [19]

Deem et al.

[11] Patent Number: 4,613,020
[45] Date of Patent: Sep. 23, 1986

[54] BRAKE SLACK ADJUSTER

[75] Inventors: Brian C. Deem, Avon Lake, Ohio; William E. Ott, Rockford, Ill.

[73] Assignee: Allied Corporation, Morristown, N.J.

[21] Appl. No.: 727,308

[22] Filed: Apr. 25, 1985

[51] Int. Cl.⁴ .............................................. F16D 65/46
[52] U.S. Cl. ................................ 180/196 M; 74/527; 188/79.5 K
[58] Field of Search .................... 74/522, 526, 527; 188/196 M, 196 BA

[56] References Cited

U.S. PATENT DOCUMENTS

| | | | |
|---|---|---|---|
| 2,001,239 | 5/1935 | Buckendale | 188/79.5 K X |
| 2,015,881 | 10/1935 | Alden et al. | 188/79.5 K X |
| 2,156,154 | 4/1939 | Hooker | 188/196 |
| 2,348,734 | 5/1944 | Freeman | 74/522 |
| 2,558,115 | 6/1951 | Williams | 74/527 |
| 2,687,046 | 8/1954 | Vorech | 74/527 |
| 2,922,317 | 1/1960 | House | 74/522 |
| 3,835,968 | 9/1974 | Seip | 188/196 P |

FOREIGN PATENT DOCUMENTS

| | | | |
|---|---|---|---|
| 448772 | 4/1968 | Switzerland | 188/79.5 K |
| 982457 | 2/1965 | United Kingdom | 188/79.5 K |

Primary Examiner—Duane A. Reger
Attorney, Agent, or Firm—Ken C. Decker; W. N. Antonis

[57] ABSTRACT

A brake slack adjuster includes a housing defining a pair of intersecting bores therein. A gear is rotatably mounted in one of the bores, and is splined to a cam shaft which mounts a cam brake actuator. A worm shaft is mounted in the other bore and a worm is rotatable with the worm shaft to turn the gear. The worm shaft is supported in the bore by a surface tapering toward the open end of the bore that cooperates with a retaining ring which is received in a circumferentially extending groove circumscribing the bore to retain the worm gear in the bore. The retaining ring terminates in an arm which tapers toward the open end of the bore and engages flats provided on the worm shaft which are adapted to receive a conventional mechanic's socket to turn the shaft when the brake is to be adjusted. The arm yieldably locks the shaft against rotation, to prevent the adjustment from backing off after it is made.

11 Claims, 4 Drawing Figures

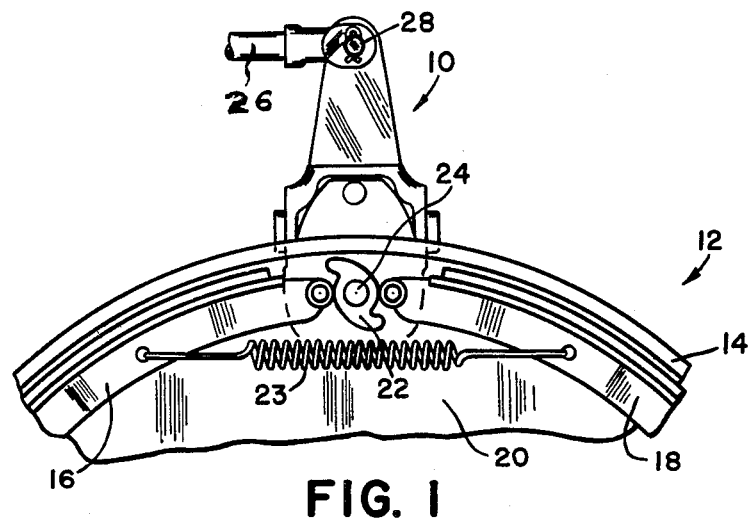
FIG. 1
FIG. 3
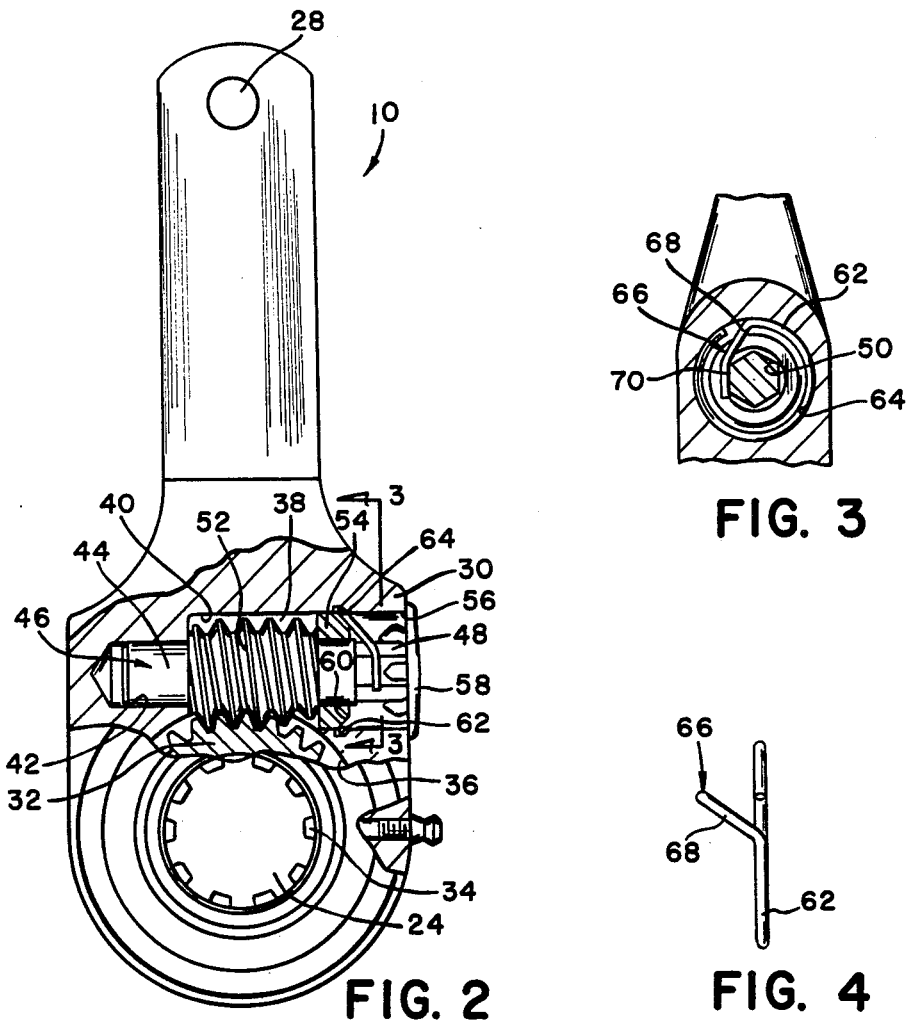
FIG. 2
FIG. 4

BRAKE SLACK ADJUSTER

This invention relates to a brake slack adjuster. Heavy duty vehicles, such as air braked trucks, are normally equipped with an S-cam braking system. This type of braking system includes an in-wheel brake in which the shoes are spread into braking engagement with the drum by an S-shaped cam. The cam is mounted on a cam shaft, which is connected for rotation by a pneumatic actuator by a brake slack adjuster. Since the brake shoes wear, it is necessary to adjust the brake released position of the cam actuator from time to time. This is done by effecting an adjustment of the brake slack adjuster.

Prior art brake slack adjusters, such as that disclosed in U.S. Pat. No. 2,558,115, provide a gear which is connected to the cam shaft through splines, and a worm mounted on a worm shaft which drivingly engages the gear. Rotation of the worm rotates the gear and therefore rotates the cam shaft relative to the slack adjuster housing. Accordingly, adjustment of the brake is effected. Although the worm must be capable of being turned manually, the worm must resist the extremely large braking forces incurred in a brake application to prevent backing off of the adjustment.

This invention has the advantage over the prior art slack adjusters in that it eliminates the complicated manufacturing processes required to provide a mechanism for locking the worm shaft by a relatively simple spring mechanism, thereby significantly reducing manufacturing costs of the slack adjuster and eliminating many of the parts used in the prior art slack adjusters.

These and other advantages of the present invention will become apparent from the following description with reference to the accompanying drawing in which:

FIG. 1 is a fragmentary plan view, partly in section, of a cam-actuated brake having a brake slack adjuster incorporating the present invention;

FIG. 2 is a side elevational view, partly in fragmentary cross section, of a brake slack adjuster made pursuant to the teachings of our present invention;

FIG. 3 is a cross-sectional view taken substantially along lines 3—3 of FIG. 2; and FIG. 4 is a view of the retaining ring and spring locking arm used in the brake slack adjuster illustrated in FIGS. 2 and 3.

Referring now to the drawings, a brake slack adjuster generally indicated by the numeral 10 is illustrated in FIG. 1 as controlling actuation of an S-cam type of drum brake generally indicated by the numeral 12. The brake 12 includes a drum 14 which is mounted for rotation with a member to be braked. A pair of brake shoes 16 and 18 are pivotally mounted on a stationary backing plate 20 for movement toward and away from the drum 14. A cam actuator 22 is rigidly mounted on a drive or cam shaft 24 which extends through the backing plate 20 between contiguous ends of the brake shoes 16 and 18. A brake return spring 23 maintains the ends of the brake shoes 16 and 18 in contact with the cam actuator 22.

The slack adjuster 10 is also mounted on the cam shaft 24. A thrust rod 26 is pivotally connected to the slack adjuster 10 by the pivot 28, and is also connected to a conventional fluid pressure actuator (not shown). When fluid pressure is admitted to the aforementioned fluid pressure actuator, the thrust rod 26 is urged to the right viewing FIG. 1, thereby pivoting the slack adjuster 10 in a clockwise direction. Movement of the slack adjuster 10 rotates the cam shaft 24 to rotate the cam 22, which thrusts the brake shoes 16 and 18 against the drum 14 to thereby effect a brake actuation. When the brakes are released, the fluid pressure actuator is evacuated, and the return spring therein acts with the brake shoe return spring 23 to urge the slack adjuster 10 in a counterclockwise direction to return the cam 22 to the position illustrated in the drawing.

The slack adjuster 10 includes a lever housing 30 which mounts a gear 32 which is splined for rotation with the cam shaft 24 via splines 34. As can best be seen in FIG. 2, rotation of the gear 32 relative to the slack adjuster housing 30 will result in corresponding rotation of the cam shaft 24 relative to the housing 30, because of the splined connection between the cam shaft 24 and the gear 32.

Gear 32 is rotatably mounted in a bore 36 provided in the housing 30. A stepped cross bore 38 intersects the bore 36 and includes a larger diameter portion 40 and a smaller diameter portion 42. One end 44 of a worm shaft generally indicated by the numeral 46 is supported by the smaller diameter portion 42 of the bore 38. The opposite end of the worm shaft 44 terminates in a section of polygonal cross section 48 which defines flats 50 about the circumference thereof. A worm 52 is integral with the worm shaft 46 in the larger portion 40 of the bore 38, and meshes with the gear 32. A collar 54 is rotatably received on the worm shaft 46 to support the latter in the larger portion 40 of the bore 38.

One end 56 of the bore 38 is open to permit access to the worm shaft 46 to effect rotation. A cover 58 normally covers the open end 56, but may be removed to permit a brake adjustment. The collar 54 includes a tapering surface 60 which tapers toward the open end 56 of the bore. A retaining ring 62 is received in a circumferentially extending groove 64 which circumscribes the wall of the larger portion 40 of the bore 38. The edge of the groove 64 nearest the open end 56 of the bore 38 is tapered corresponding to the tapered surface 60 of the collar 54. Accordingly, small clearances can be easily taken up due to the correspondingly tapered surface while permitting a small amount of axial movement of the worm shaft 46.

One end of the retaining ring 62 terminates in a spring arm 66 which has a tapered portion 68 which tapers toward the open end 56 of the bore 38. Spring arm 66 terminates in a portion 70 which extends parallel to and in engagement with one of the flats 50 on the worm shaft 46. The resiliency of the tapered portion 68 of the arm 66 yieldably biases the portion 70 into engagement with the flats to thereby restrain relative rotation of the worm shaft 46 within the housing 30 while being deflectable radially with respect to bore 38 to permit rotation of the shaft when adjustment of the brake is to be effected.

Accordingly, ring 62, arm 66 tapered portion 68 and portion 70 act as a lock means to resist rotation of the shaft 46.

In operation, when a brake application is effected, the aforementioned fluid pressure actuator (not shown) operates the thrust rod 26, thereby rotating the slack adjuster 10 in a clockwise direction. Because the spring arm 66 locks the worm shaft 46 against rotation, braking forces can be transmitted through the actuator housing 30, through the worm shaft 46 to the worm 52 and from there to the gear 32. Because of the splined connection between the gear 32 and the cam shaft 24, rotation of the slack adjuster 10 will be transmitted to the cam 22, causing the latter to spread the brake shoes 16, 18 into engagement with the rotating drum 14, thereby effecting a brake application. When the brakes are released, the slack adjuster 10 is rotated in the counterclockwise direction, as described hereinabove, thereby permitting the return spring 23 to urge the brake shoes 16 and 18 away from the drum 14.

Of course, repeated brake applications will result in the wearing away of the friction material on the brake shoes 16 and 18. In order to maintain the brake release clearance between the shoes and the drum, it is necessary to periodically index the brake-released position of the cam 22. This is done by rotating the cam shaft 24 by operation of the worm gear 52. Accordingly, when a brake adjustment is to be effected, the removable cover 58 is removed and a conventional mechanic's socket wrench is placed over the end of the worm shaft 46. Because of the taper of the portion 68 of the arm 66, by pushing down on the worm shaft 46 with the socket, the spring pressure of the arm 66 against the worm shaft 46 is partially relaxed, thereby permitting the mechanic to turn the worm shaft, thereby turning the worm 52. Because worm 52 is meshed with the gear 32, rotation of the worm 52 also effects rotation of the gear 32, thereby rotating the cam shaft 24 to index the brake-released postion of the cam 22.

We claim:

1. Brake slack adjuster comprising a housing, said housing defining a pair of intersecting bores therewithin, a gear rotatably mounted in one of said bores, a worm mounted on a worm shaft rotatable in the other bore and drivingly engaged with the gear, rotation effecting means on said worm shaft for effecting rotation of said worm from the exterior of said housing, a collar mounted on said worm shaft for rotatably supporting the latter in said other bore, and lock means cooperating with said collar and the wall of the other bore to prevent axial movement of the collar with respect to said other bore, said lock means including a resilient arm projecting radially into said bore and being deflectable radially with respect to said other bore, said arm releasably engaging said worm shaft to inhibit rotation of the latter relative to said bore.

2. Brake slack adjuster comprising a housing, said housing defining a pair of intersecting bores therewithin, a gear rotatably mounted in one of said bores, a worm mounted on a worm shaft rotatable in the other bore and drivingly engaged with the gear, rotation effecting means on said worm shaft for effecting rotation of said worm from the exterior of said housing, a collar mounted on said worm shaft for rotatably supporting the latter in said other bore, and lock means cooperating with said collar and the wall of the other bore to prevent axial movement of the collar with respect to said other bore, said lock means including an arm projecting radially into said bore and engaging said worm shaft to inhibit rotation of the latter relative to said bore, said other bore defining an open end to permit access to the worm shaft for effecting rotation of the latter, said arm tapering toward said open end as it projects into said bore, said arm being resilient to yieldably resist rotation of the worm shaft.

3. Brake slack adjuster comprising a housing, said housing defining a pair of intersecting bores therewithin, a gear rotatably mounted in one of said bores, a worm mounted on a worm shaft rotatable in the other bore and drivingly engaged with the gear, rotation effecting means on said worm shaft for effecting rotation of said worm from the exterior of said housing, a collar mounted on said worm shaft for rotatably supporting the latter in said other bore, and lock means cooperating with said collar and the wall of the other bore to prevent axial movement of the collar with respect to said other bore, said lock means including an arm projecting radially into said bore and engaging said worm shaft to inhibit rotation of the latter relative to said bore, said lock means being a circumferentially extending retaining ring having corresponding circumferentially spaced ends, one end of said retaining ring terminating in said arm, said arm being resilient to yieldably resist rotation of said worm shaft.

4. Brake slack adjuster as claimed in claim 3, wherein a circumferentially extending groove circumscribes the wall of said other bore, said retaining ring being received in said groove but projecting therefrom to engage said collar.

5. Brake slack adjuster as claimed in claim 4, wherein one edge of said groove tapers toward one end of the other bore, said collar having a corresponding tapered surface, said tapered surface engaging said retaining ring whereby said retaining ring prevents movement of the collar toward said one end of the other bore.

6. Brake slack adjuster as claimed in claim 5, wherein said one end of said other bore defines an opening to permit access to the worm shaft for effecting rotation of the latter, said arm tapering toward said open end as it projects into said bore, said arm being resilient to yieldably resist rotation of the worm shaft.

7. Brake slack adjuster as claimed in claim 6, wherein said rotation effecting means is a series of flattened portions on said worm shaft engageable by a tool to effect rotation of the worm shaft, said arm engaging one of said flats.

8. Brake slack adjuster as claimed in claim 6, wherein said bore is stepped to define larger and smaller diameter portions, one end of said worm shaft being rotatably supported in said smaller diameter portion, said collar rotatably supporting the other end of said worm shaft.

9. Brake slack adjuster as claimed in claim 8, wherein said worm shaft is movable axially within said other bore, said arm being responsive to axial movement of said worm shaft away from the open end of said other bore to deflect toward the wall of said other bore to thereby relieve at least partially the resilient force applied to said worm shaft by said arm.

10. Brake slack adjuster as claimed in claim 4, wherein said other bore is stepped to define larger and smaller diameter portions, one end of said worm shaft being rotatably supported in said smaller diameter portion, said collar rotatably supporting the other end of said worm shaft.

11. Brake slack adjuster as claimed in claim 3, wherein said worm shaft is movable axially within said other bore, said arm being responsive to axial movement of said shaft to deflect toward the wall of said other bore to thereby relieve at least partially the resilient force applied to said worm shaft by said arm.

* * * * *